Patented May 12, 1953

2,638,486

UNITED STATES PATENT OFFICE 2,638,486

CHEMICAL COMPOSITION

Max Eugene Chiddix, Easton, Pa., and Stanley Hall Hesse, Phillipsburg, and Edwin James Seiferle, Belvidere, N. J., assignors to General Aniline & Film Corporation, New York, N. Y., a corporation of Delaware No Drawing. Application May 3, 1951,
Serial No. 224,442

3 Claims. (Cl. 260—619)

This invention relates to the novel compound 2,2'-ethylidenebis 3,4,6-trichlorophenol and the process for producing it.

The compound has the following formula

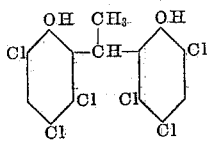

This compound may be prepared by reacting 2,4,5-trichlorophenol and acetaldehyde or an acetaldehyde producing compound in the presence of basic catalysts, such as alkali metal hydroxides, sodium hydroxide and alkali metal carbonates, e. g. potassium carbonate.

The compound, 2,2'-ethylidenebis 3,5,6-trichlorophenol is of importance for use as a germicide, fungicide or antiseptic, particularly for use as a germicide in soap. The new compound is a white crystalline material which is substantially tasteless and odorless, permitting its use as an antiseptic and germicide. The compound may be utilized as such or its salts may be used in the solid form or in solution or dispersion. It may be used in admixture with other active or inert materials as tooth pastes, ointments, shampoo, cosmetics, dusting powder for rubber goods, etc.

The process for the preparation of this compound is unique, in that acid catalysts ordinarily used for the preparation of bis-phenols of similar type, do not form any of the desired product. When 2,4,5-trichlorophenol and paraldehyde were reacted with 20% oleum at 130° C. for about 15 minutes, no product was obtained. When 2,4,5-trichlorophenol and paraldehyde were reacted in a mixture of sulfuric and acetic acids at 95-100° C. for 2½ hours, no product was obtained. When 2,2'-ethylidenebis p-chlorophenol was chlorinated in acetic acid until the theoretical gain in weight had occurred, the desired product was not obtained even if ferric chloride or iodine were used as catalysts and at temperatures of 14, 30, or 95° C. When 2,4,5-trichlorophenol and paraldehyde were reacted with 20% oleum at 4-6° C. for 4 hours, no product was obtained. When 2,4,5-trichlorophenol and paraldehyde were reacted with methane sulfonic acid at 60° C. or at 100-8° C., no product was obtained. When 2,4,5-trichlorophenol and paraldehyde were treated with 50% HF at 95° C. for 20 hours, only a small amount of tarry material was obtained which could not be crystallized. When 2,4,5-trichlorophenol and dimethyl acetal were reacted with sulfuric acid at 50-5° C. for four hours, no product was obtained.

The following examples are preferred embodiments of the invention but it is understood that substitutions and variations may be made within the scope of the claims:

EXAMPLE 1

Ninety-nine parts of 2,4,5-trichlorophenol were melted in a vessel equipped with a stirrer, dropping funnel and reflux condenser and heated to about 95° C. There were added 4 parts powdered sodium hydroxide and then 11 parts paraldehyde were added dropwise in about 2 hours. The reaction mixture was stirred an hour after the addition was complete and then 11 parts paraldehyde were added dropwise in about 2 hours to make a 100% excess. The stirring was continued at 95° C. for a total of 24 hours. The reaction mixture was now acidified with hydrochloric acid and steam distilled until the distillate was negative to FeCl₃. There were 23 parts of crude product obtained as a residue. This crude tar was dissolved in 5% NaOH solution, heated to boiling, treated with Norite and filtered hot by gravity. The cool filtrate was acidified with HCl to yield 28.5 parts of product (27% of the theoretical yield). This was crystallized from 40 parts acetic acid to yield 5 parts of product which melted at 154-163° C. Recrystallization from 20 parts of acetic acid gave 2.5 parts of product which melted at 167.5-168° C. Calculated for Cl—50.53. Found 49.04.

EXAMPLE 2

In a vessel equipped with a stirrer, dropping funnel and reflux condenser and heated on a steam bath were melted 99 parts 2,4,5-trichlorophenol, to which are added 5.6 parts powdered potassium hydroxide. Then 11 parts paraldehyde were added dropwise to the hot reaction mixture in about 1½ hours. When addition was complete 5.6 parts powdered potassium hydroxide were added, and 11 parts paraldehyde were added dropwise in about 1½ hours. The reaction mixture was stirred at 95° C. overnight and then 11 parts paraldehyde were added dropwise. The reaction mixture was stirred at 95° C. for a total time of 28 hours. The cool reaction mixture was acidified with HCl and steam distilled until the distillate was negative to FeCl₃. There were 9 parts of crude product obtained as a residue.

EXAMPLE 3

In a vessel equipped with a stirrer, dropping funnel and reflux condenser and heated on a steam bath were melted 990 parts 2,4,5-trichlorophenol, to which were added 40 parts powdered sodium hydroxide and 110 parts paraldehyde dropwise in about 2 hours. When the addition was complete, an additional 40 parts powdered sodium hydroxide were added and 110 parts paraldehyde were added dropwise in about 2 hours. The reaction mixture was stirred at 95° C. overnight, and then 110 parts paraldehyde were added dropwise in about 2 hours. The reaction mixture was stirred at 95° C. for a total time of 28 hours. The cool reaction mixture was acidified with HCl and steam distilled until the distillate was negative to $FeCl_3$. The crude, tarry residue was dissolved in 1,500 parts of 5% NaOH, heated to boiling, treated with Norite and filtered hot by gravity. Acidification of the cool alkaline filtrate with HCl gave 126 parts of crude product (12% of the theoretical yield). Crystallization from 250 parts acetic acid gave 22 parts of product which melted at 157–162° C. Recrystallization from 80 parts acetic acid gave 13 parts of product which melted at 167–8° C.

The following table shows the results of bactericidal and bacteriostatic tests comparing the compound with similar or homologous compounds.

*Bactericidal test*

MATERIALS (1) Soap—4% solution of soap granules; germicide at a concentration of 2% of soap or 0.08% in the solution.
(2) Detergent—3.5% solution of an alkyl sulfate base detergent; germicide at a concentration of 2% of detergent or 0.07% in the solution.
(3) Difco bacto-nutrient agar.
(4) F. D. A. (U. S. Food and Drug Administration) nutrient broth.
(5) Tryptone-glucose extract agar.

ORGANISM

*Staphylococcus aureus* 209 (now known officially as *Micrococcus pyogenes* var. *aureus*, Bergey VI) is maintained on tryptone-glucose extract agar. Three consecutive transfers are made from this stock culture in F. D. A. broth at 24 hour intervals. The third transfer is used and contains about 500,000,000 organisms per ml.

PROCEDURE

Sterile contact tubes containing 10 ml. of the soap-germicide solution are placed in a 37° C. water bath and permitted to reach temperature. One ml. of the test organism culture is added to each tube and mixed well. After 5 minutes' contact at 37° C., one ml. is removed from each contact tube and diluted to 100 ml. with sterile distilled water. Since a number of tests are run at the same time, this dilution usually stands for about 15–20 minutes before further dilution and plating.

Dilutions of 1–1,000 and 1–10,000 are plated in nutrient agar. The plates are incubated for 48 hours at 37° C. and then counted. The numbers reported are those bacteria remaining alive from the original 1 ml. sample which was removed from the contact tube. All tests are run in duplicate.

*Bacteriostatic test*

MATERIALS (1) F. D. A. nutrient broth.
(2) 0.005%, 0.05%, and 0.5% solutions of soap granules (Ivory Snow).
(3) 0.005%, 0.05%, and 0.5% solution of alkyl sulfate base detergent (Dreft).
(4) 0.001%, 0.01%, and 0.1% alcoholic solution (or acetone if necessary) of germicide.

ORGANISM

*Staphylococcus aureus* 209, as described in the bactericidal test.

PROCEDURE

Five tubes of broth are used for each dilution tested. Each tube contains 10 ml. of sterile broth, 1 ml. of the appropriate detergent dilution, 0.1 ml. of the correct germicide solution, and 0.1 ml. of broth culture as the inoculum. The ratio of detergent to germicide is always 50:1, as before. The concentrations of germicide tested in the final tubes were 1–1,000,000. The turbidity of the solutions are read at zero time in the Coleman Spectrophotometer, Model 6A, at 610γ. After 24 hours' incubation at 37° C., turbidity readings are repeated. Increased turbidity is taken as evidence of growth. No change indicates bacteriostatic action. Changes of 5 units, or less, show good activity at that concentration.

TABLE

| Compound | Bactericidal Test [1] | | Bacteriostatic Assay [2] | |
|---|---|---|---|---|
| | Soap | Detergent | Soap, 1–1,000,000 | Detergent, 1–1,000,000 |
| 1. methylenebis trichlorophenol | 26,600 | 300 | 1 | 1 |
| 2. methylenebis dichlorophenol | 9,000 | 9,500 | 2 | 3 |
| 3. Example 1 | 17,000 | 1,100 | 0 | 0 |

[1] Surviving organisms (*Staphylococcus aureus* 209—Gram+) per ml. recovered after 5 minutes' contact with approximately 50,000,000 per ml. at zero time. Each value is the average of at least four separate tests.
[2] These values are given as percent change of light transmission (0–24 hrs. incubation). All tests were made on 5 replicates.

The compound may be used in the form of its mono- or di-alkali metal salt which may be obtained by reaction with an alkali metal hydroxide or basic salt thereof, or with ammonia or amines. This is important since in the use of the compound in soap the sodium salt is apparently formed without reducing the antiseptic or germicidal character of the compound.

Salts may be formed with other metals such as calcium, barium, copper, aluminum and zinc. While these salts may be less soluble in water, they still exhibit antiseptic and germicidal properties.

We claim:

1. A process for preparing 2,2'-ethylidenebis 3,5,6-trichlorophenol which comprises reacting 2,4,5-trichlorophenol and acetaldehyde yielding substance in the presence of a substantially anhydrous alkaline catalyst.

2. A process of claim 1 wherein paraldehyde is the acetaldehyde yielding substance, and it is added gradually over a period of several hours.

3. The process of claim 2 wherein the mixture is stirred for several hours after the paraldehyde is added, then the catalyst is neutralized and the mixture is steam distilled.

MAX EUGENE CHIDDIX.
STANLEY HALL HESSE.
EDWIN JAMES SEIFERLE.

References Cited in the file of this patent

UNITED STATES PATENTS

| Number | Name | Date |
|---|---|---|
| 1,800,296 | Honel | Apr. 14, 1931 |
| 2,250,480 | Gump | July 29, 1941 |